(12) United States Patent
Homyk (10) Patent No.: US 7,626,839 B2
(45) Date of Patent: Dec. 1, 2009

(54) PORTABLE DEVICE FOR GENERATING TWO PHASES FROM A SINGLE ELECTRICAL PHASE

(75) Inventor: William Alan Homyk, Hopewell Junction, NY (US)

(73) Assignee: Consolidated Edison Company of New York, Inc., New York, NY (US)

( * ) Notice: Subject to any disclaimer, the term of this patent is extended or adjusted under 35 U.S.C. 154(b) by 266 days.

(21) Appl. No.: 11/850,075

(22) Filed: Sep. 5, 2007

(65) Prior Publication Data

US 2009/0059638 A1    Mar. 5, 2009

(51) Int. Cl.
*H02M 5/06* (2006.01)
*H02M 5/10* (2006.01)

(52) U.S. Cl. ..................................... 363/154; 363/153

(58) Field of Classification Search ................. 363/142, 363/143, 146, 148, 149, 152–154; 323/355, 323/358, 359
See application file for complete search history.

(56) References Cited

U.S. PATENT DOCUMENTS

| 4,644,241 | A | * | 2/1987 | Maeda | 318/768 |
| 5,084,812 | A | * | 1/1992 | Hausler et al. | 363/72 |
| 5,905,367 | A | * | 5/1999 | Hochgraf | 323/210 |

* cited by examiner

*Primary Examiner*—Matthew V Nguyen
(74) *Attorney, Agent, or Firm*—Cantor Colburn LLP (57) ABSTRACT

A portable device for generating two electrical phases from a single electrical phase. The portable device includes a housing having a toroidal transformer therein. An input terminal block and an output terminal block are mounted to the housing and are electrically connected to the toroidal transformer. The portable device is sized to fit on the rear floor of a vehicle and an appropriate weight to be carried by a single person.

20 Claims, 6 Drawing Sheets

PORTABLE DEVICE FOR GENERATING TWO PHASES FROM A SINGLE ELECTRICAL PHASE

BACKGROUND OF THE INVENTION

The present invention relates generally to a portable device for creating a second electrical phase from a single phase and in particular to a portable device that creates a second phase of electricity from a single-phase source and is sized to fit for transportation in a vehicle.

Residential homes typically have three conductors entering the building from the street utility electric lines. Two of the conductors are power conductors each carrying a single phase of electricity. Meaning the waveforms of the electricity on the two conductors are typically out of phase by 180 degrees. The third conductor entering the building is what is known as a neutral phase, which connects to earth ground. While the neutral may carry current, it normally will have no electrical potential or voltage. Each phase of the power conductors connects with one branch of 120V circuits within the building. Where 240V is required, for a stove or electric clothes dryer for example, both power conductors are used for that circuit.

Occasionally, an issue will arise with one of the three conductors going into the building. For example, the conductor may break or short causing a loss of electrical power on that conductor while the others continue to function. In this instance, the building will still receive electrical power, but on only one of the phases. Issues may arise if the conductor cannot be promptly repaired, as may be the case when power is lost in the conductor during the middle of the winter and the frozen ground can not be excavated to remove and replace the cable. Until the cable is replaced, the building will be without full use of the electrical circuits, and a user may not be able to use appliances such as a stove, clothes dryer, or air conditioner.

Where the cable cannot be readily repaired, electric utilities often resort to running another conductor from a separate service, such as a light pole to the building. Often this involves suspending the cable in the air with temporary braces which are time consuming to construct and unsightly. Also, this temporary conductor is typically not connected to the buildings electric meter resulting in a loss of revenue. Alternatively, the utility may use a technique known as "bridging" that connects the one good phase to both circuits of the building. However, the bridging technique may not allow use of certain appliances due to a lack of voltage since both circuits are in phase with each other at 120V.

While existing systems and methods for providing two phase electrical service are suitable for their intended purposes, there still remains a need for improvements particularly regarding the creating of a second electrical phase with a portable device that may be readily deployed and installed in the field.

SUMMARY OF THE INVENTION

A portable device for generating two electric phases is from a single phase is disclosed having a housing sized to fit on the rear floor of a vehicle. The device has a first and second input mounted to said housing. A toroidal transformer winding having primary and secondary sides is mounted within said housing where the primary side is electrically coupled to the first and second input. A first, second and third of output is electrically coupled to the toroidal transformer winding secondary side.

A portable device for generating two electric phases from a single phase of electricity is also disclosed with a housing having a handle. The housing is sized and of an appropriate weight to be carried by a single person. A first, second and third phase inputs are mounted to the housing. A toroidal transformer is also mounted to the housing and is electrically coupled to the first, second and third phase inputs. A switch electrically is coupled to the first, second and third inputs. A first, second and third phase outputs are mounted to the housing and are also electrically coupled to the toroidal transformer.

A portable electrical phase generator is also disclosed having a housing sized to fit in the rear of a vehicle. The housing further has a recessed top portion with a handle mounted in the recessed top portion. A first terminal block having a plurality of phase inputs is mounted to the housing and at least one of the phases is a neutral phase. A toroidal transformer having a primary winding and a secondary winding is mounted to said housing and is electrically coupled to the plurality of phase inputs. A second terminal block having a plurality of phase outputs is electrically coupled to the toroidal transformer secondary winding.

BRIEF DESCRIPTION OF THE DRAWINGS

Referring now to the drawings, which are meant to be exemplary and not limiting, and wherein like elements are numbered alike.

DETAILED DESCRIPTION

Figure 1:
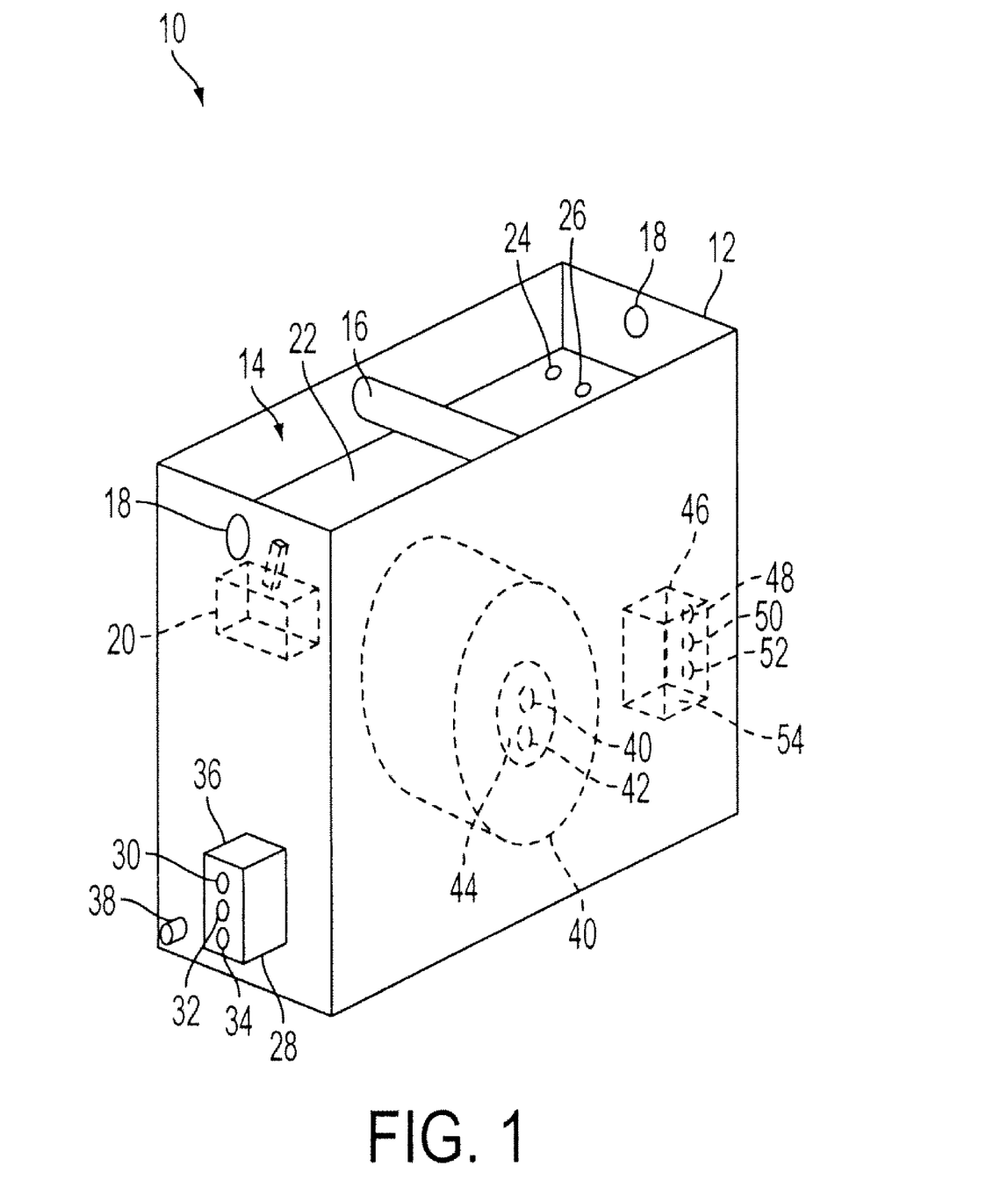
FIG. 1 is an illustration in perspective view of an embodiment of a portable two-phase electrical generation device.

FIG. 1 illustrates an exemplary embodiment of a portable two-phase electrical generation device 10. The portable device 10 includes a housing 12 having a recessed portion 14. A handle 16 and a pair of holes 18 are located within the recess 14. The holes 18 may be used to attach a shoulder strap (not shown—but claimed) to facilitate the carrying of the portable device. The housing 12 may be made from any suitable material, such as steel, aluminum, or non-conductive composite material or the like for example, that is durable enough to withstand repeated deployment of the portable device 10. A switch 20 is mounted to the floor 22 of the recess 14. In the exemplary embodiment, the switch 20 is a thermal-magnetic type circuit breaker that includes mechanisms for automatically switching to an off-position in the event of an undesirable electrical condition such as high current levels for an extended period of time.

It is contemplated that other types of switches 20 may also be used, including but not limited to: a single-pole single-throw; a single-pole double-throw; a single-pole change-over; a double-pole single-throw; a double-pole single-throw; a double-pole double-throw; a hall-effect; a toggle; or an inertial switch. Alternatively, in some applications, it may be advantageous to provide remote activation of switch 20. Where remote activation is desired, the switch 20 may include, but not limited to: a remote controlled circuit breaker; a circuit breaker with a shunt trip; a contactor or a relay.

A pair of visual indicators, such as LED's for example, are also mounted in the floor 22 of the recess 14. The visual indicators may include an on-off status indicator 24 and an overload status indicator 26. The visual indicators 24, 26 are electrically connected to the switch 20 to provide the operator a visual means of determining the operating state of the portable device 10. In the exemplary embodiment, the overload indicator 26 is triggered to an on indication when a thermal overload condition, if too many electrical appliances are connected to the portable device 10 for example, is detected by the switch 20 resulting in the ceasing of the flow of electrical power through the portable device 10.

An input terminal block 28 is mounted on one side of the housing 12. The terminal block 28 includes three openings to receive an A-phase 30, Neutral 32, and B-Phase 34 input electrical conduits. Each of the openings 30, 32, 34 includes a means for securing the conduits (not shown), such as a terminal screw or lug. An electrically insulating cover 36 surrounds the terminal block 28 and the securing means to prevent inadvertent contact by the operator during operation. A ground lug 38 is also mounted to the house 12 to provide a means for electrically connecting the housing 12 to earth, through a buildings grounding wire or to a water pipe for example.

A toroidal transformer 40 is mounted to the housing 12 by a pair of bolts 42. The bolts 42 pass through a plate 44 that captures the toroidal transformer 40 against the housing 12. An output terminal block 46 is mounted to the housing 12 on a side opposite the input terminal block 28. Similar to the input terminal block 28, the output terminal block includes three openings 48, 50, 52 to receive electrical conduits from the load, the building's load center for example, for the A-phase, neutral, and B-phase respectively. The terminal block 46 will also include a means for securing the conduits (not shown). An insulating electrical cover 54 surrounds the terminal block 46 and prevents inadvertent contact with the terminal block 46 and the load-side conduits during operation.

Figure 2:
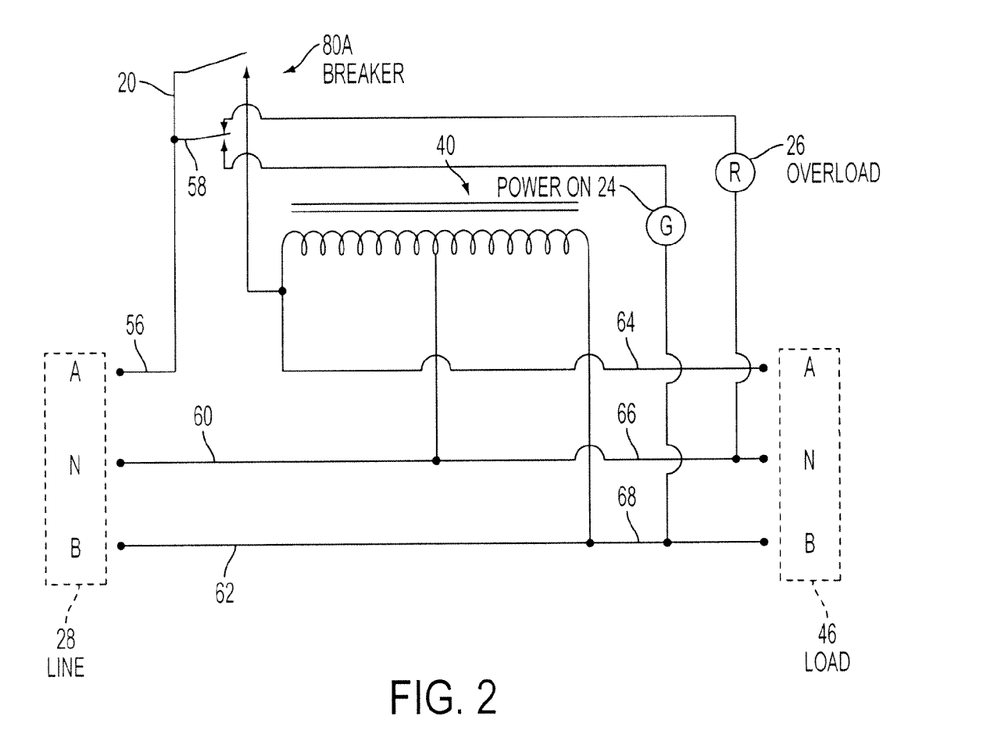
FIG. 2 is a schematic illustration of a portable two-phase electrical generation device of FIG. 1.

The components of portable device 10 are electrically coupled as illustrated in FIG. 2. In the exemplary embodiment, the A-phase is connected to cable 56 and coupled to the toroidal transformer 40 via switch 20. A relay 58 internal to switch 20 electrically couples the visual indicators 24, 26 to the switch 20 and is movable between an on-position wherein electrical power flows to on-indicator 24 and an overload position connecting the overload-indicator 26 to the electrical circuit. It should be appreciated that while the relay 58 is illustrated in the exemplary embodiment as being internal to the switch 20, the relay 58 may also be incorporated as a separate component. In operation, when an overload condition is sensed by switch 20, the switch 20 switches to the tripped or off position that disconnects power to the terminal block 46. When this occurs, the internal relay 58 switches to the overload position-causing indicator 26 to illuminate. When the switch 20 is reset, the internal relay 58 switches to the on-position.

The neutral cable 60 and B-phase cable 62 are connected to the input or primary side of toroidal transformer 40. Cables 64, 66, 68 connect to the load or secondary side of the toroidal transformer 40 to the A-phase, neutral and B-phase openings in output terminal block 46 respectively. In the exemplary embodiment, the toroidal transformer 40 includes three taps with the A-phase and B-Phase cables 56, 62 being connected to the ends of the toroidal transformer and the neutral cable 66 being connected to a center tap. It should be appreciated that while the windings of the toroidal transformer 40 are described with a single winding having a primary and a secondary side, other transformer constructions, such as but not limited to a transformer having a separate primary winding and secondary winding may also be used.

Figure 3:
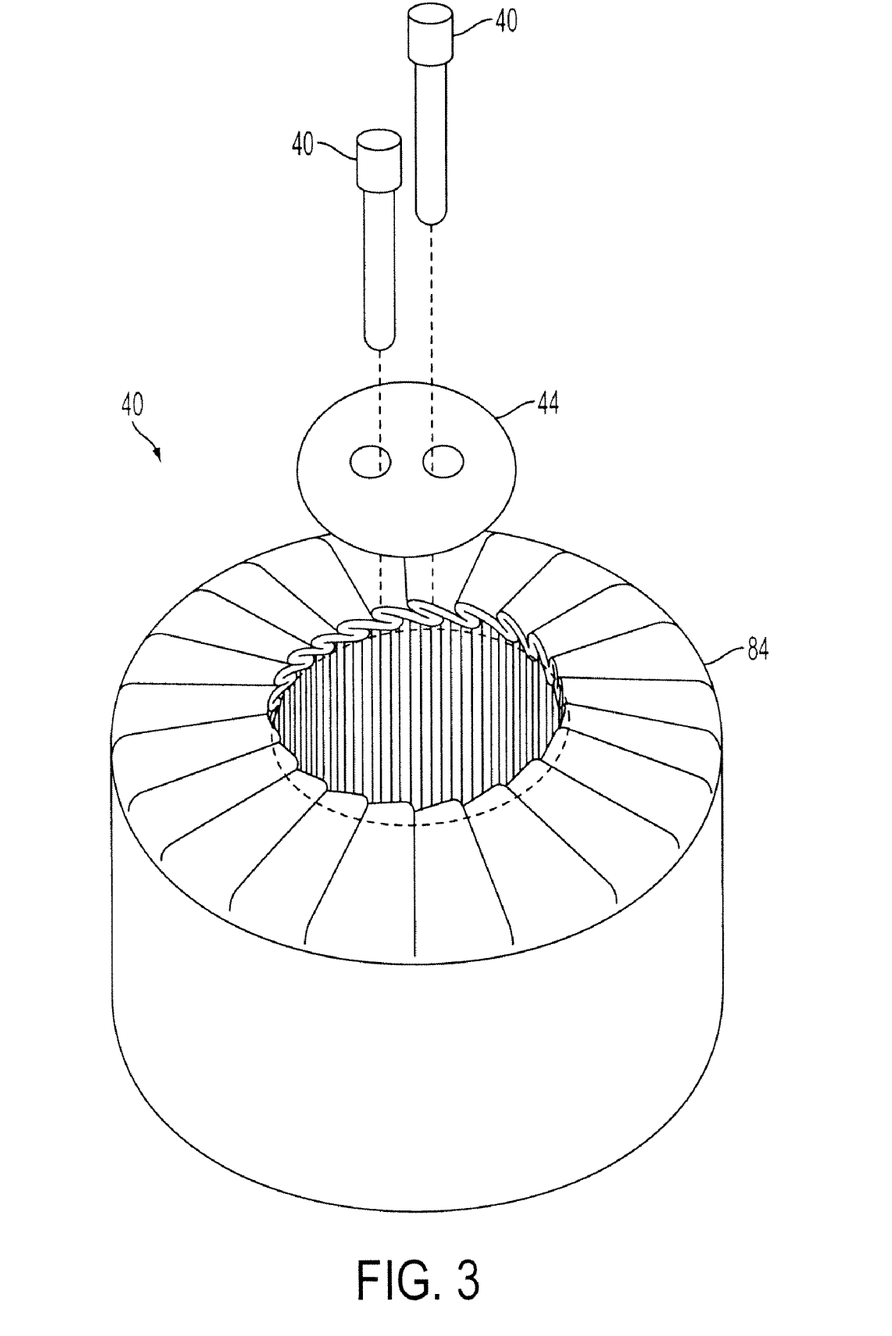
FIG. 3 is an illustration of an embodiment of the toroidal transformer used in the portable two-phase electrical generation device of FIG. 1.
Figure 4:
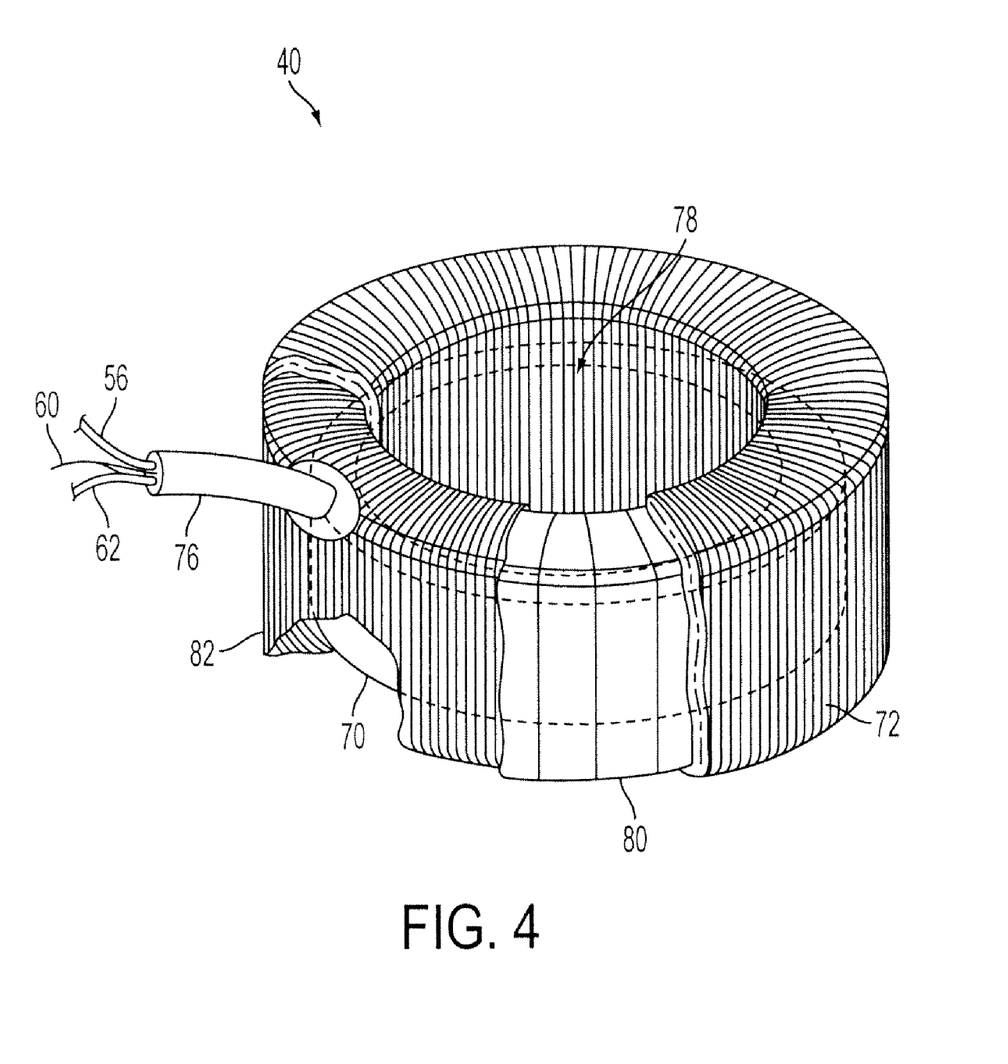
FIG. 4 is an illustration partially in section, of an embodiment of the toroidal transformer of FIG. 3.

A typical toroidal transformer 40 is described in more detail with reference to FIG. 3 and FIG. 4. The toroidal transformer 40 includes a core 70 that is covered by an insulation material (not shown). A winding 72 with lead cables 56, 60, 62 and an insulation sleeve 76 wrapped around the cross section of core 70 and distributed along the circumference of the core 70. This is typically done in a toroidal winding machine by threading a circular winding head with a magazine for storing magnet wire through a center hole 78 in core 70, then storing magnet wire on the magazine, and finally rotating the winding head around the core 70 through the center hole 78 while pealing copper wire off the magazine. The core 70 is rotated slowly about the toroidal axis during winding, so the wire is distributed along the circumference of the core 70.

An insulation portion 80 separates the winding 72 from the transformer core 70. The insulation 80 is typically a strip of plastic film that is wrapped in several layers over the transformer core 70. The strips are overlapped laterally to provide creep insulation across the strip. Insulation 80 is typically made from a plastic such as, but not limited to polyethylene terephtalate (PEPT) film. The winding 72 is wound on top of the insulation 80. A final insulation layer 84 is wrapped around the winding 72 for protection. Alternatively, the toroidal transformer may be potted in plastic to provide the final insulation layer.

The portable device 10 may be used in a variety of applications. For example, in the event that a residential building experiences a loss of electrical power in one of the conductors between the street utility line and the home's electrical load center. The portable device 10 may also be used in other applications where two-phase electrical power is required, but only a single electrical phase is available. For example, portable air conditioning units are sometimes used to cool transformers during hot summer months to prevent overheating. To provide power to the air conditioner, the utility must find two separate electrical phases. Often this requires using a readily available source, such as a streetlight for example, with a less available power source, such as an electrical conduit located in a manhole below street. Other examples include, but are not limited to, the use of the portable device 10 to power parked police mobile command centers, recreational vehicles, or refrigerated trucks; thereby eliminating the unnecessary expense, air pollution, and noise associated with running the engines on these units. Finding a second electrical phase often requires installing electrical conductors over extended distances which is inconvenient to both the operators and those who live and work nearby since the conductors need to be appropriately barricaded.

Where a second electrical phase is needed, the portable device 10 may be connected to an available electrical phase to produce the necessary two electrical phases. Using a lost conductor from the utility street electric line as an example, a technician would first be dispatched to diagnose the problem. Upon determining that electrical power has been lost in one of the conductors, the technician would isolate the failed conductor until repairs could be made. The technician would then connect the de-energized but good single-phase conductor to the A-phase opening 30 and the neutral phase to the neutral opening 32 in terminal block. The non-live conductor may be connected to the B-Phase opening 34. Alternatively, the operator may cap the B-phase opening 34 with an insulating plug (not shown) to prevent any inadvertent contact by the operator.

Conductors would then be connected between the output terminal block 46 and the A-phase, B-phase and neutral connections in the buildings load center to complete the power connection between the street utility electric line and the buildings load center. It should be appreciated that this connection is advantageous to the electric utility since the connection may be made after the electrical meter on the building, allowing the utility to continue to collect revenue from the customer and without disturbing or removing the meter from its socket. Once the live conductor is energized, and the switch 20 is moved to the on position, electricity from the live conductor passes through the opening 30, cable 56 and into the toroidal transformer. In the exemplary embodiment the toroidal transformer will have a turn ratio of 2:1 and a power rating of 6 kW-10 kW, and more preferably a power rating of 8 kW. The toroidal transformer 40 provides an electrical power to both the A-phase cable 64 and B-phase cable 68. In the exemplary embodiment where the turn ratio is 2:1, the portable device will provide electrical service for each circuit of the building at 120V, 60 A, with the electrical waveform of the A and B phases being 180 degrees apart.

The portable device 10 may also be used in an instance where there is an issue with the neutral cable between the building and the street utility electrical lines. In this embodiment, the technician connects the A-phase and B-phase conductors from the street utility line are connected to the A-phase 30 and B-phase 34 openings in terminal block 36. The load or output side is connected to the building load center as described above. The neutral opening 50 is connected to a suitable ground to provide a neutral connection for the building.

In practice, the portable device 10 may need to be deployed into the field in less than desirable circumstances. Since the portable device 10 may be used to restore electrical service to a residential building, the portable device must be of such a size to allow easy transportation and installation. In the exemplary embodiment, the portable device 10 is sized to fit on the rear seat, or rear floor of a vehicle such as a standard sized sedan. It is also desirous for the portable device to be transported by a single person so that a single technician may be dispatched to perform the repair. In the exemplary embodiment, the portable device 10 weighs less than 60 lbs. Further, since it is likely that the portable device 10 will be installed in a utility room, typically located in a basement, a small size and weight will facilitate deployment in building that requires traversing narrow hallways and staircases.

Figure 5:
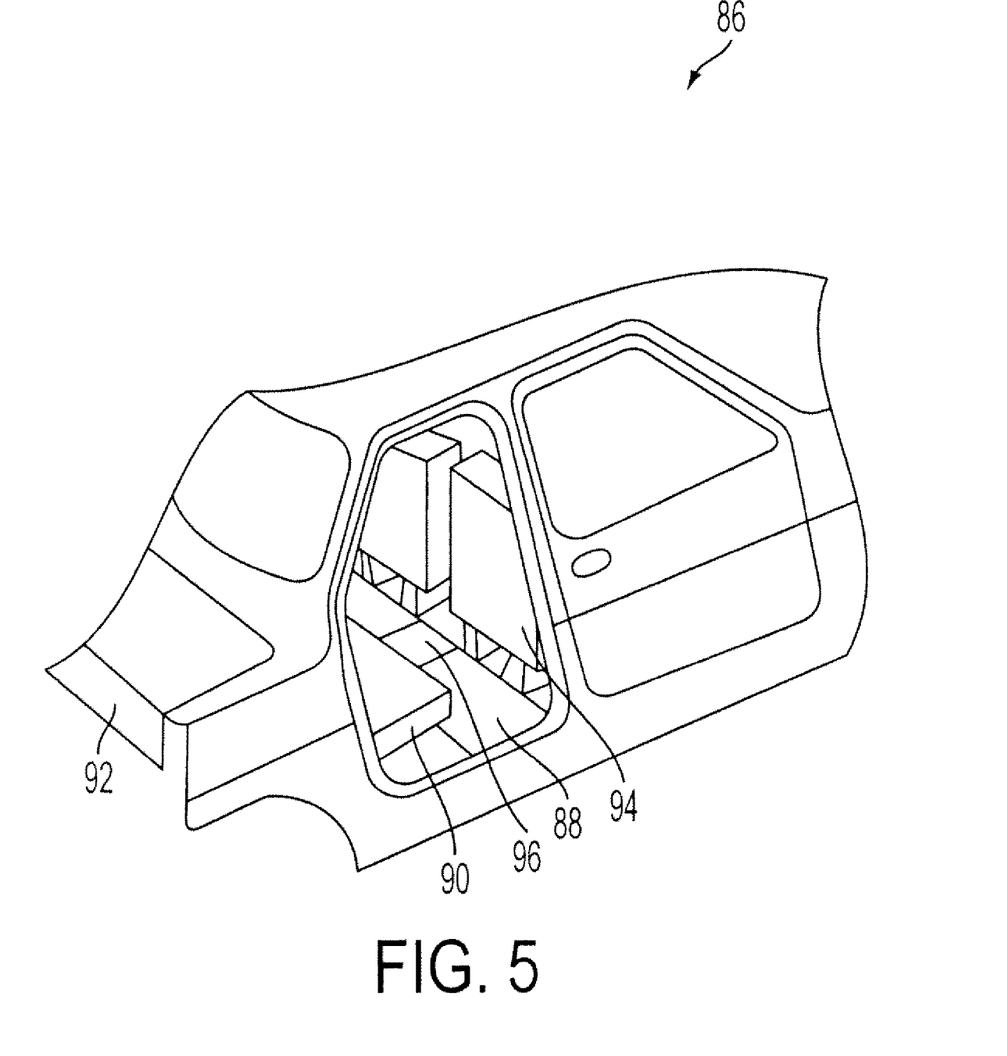
FIG. 5 is an illustration of a portion of a vehicle.
Figure 6:
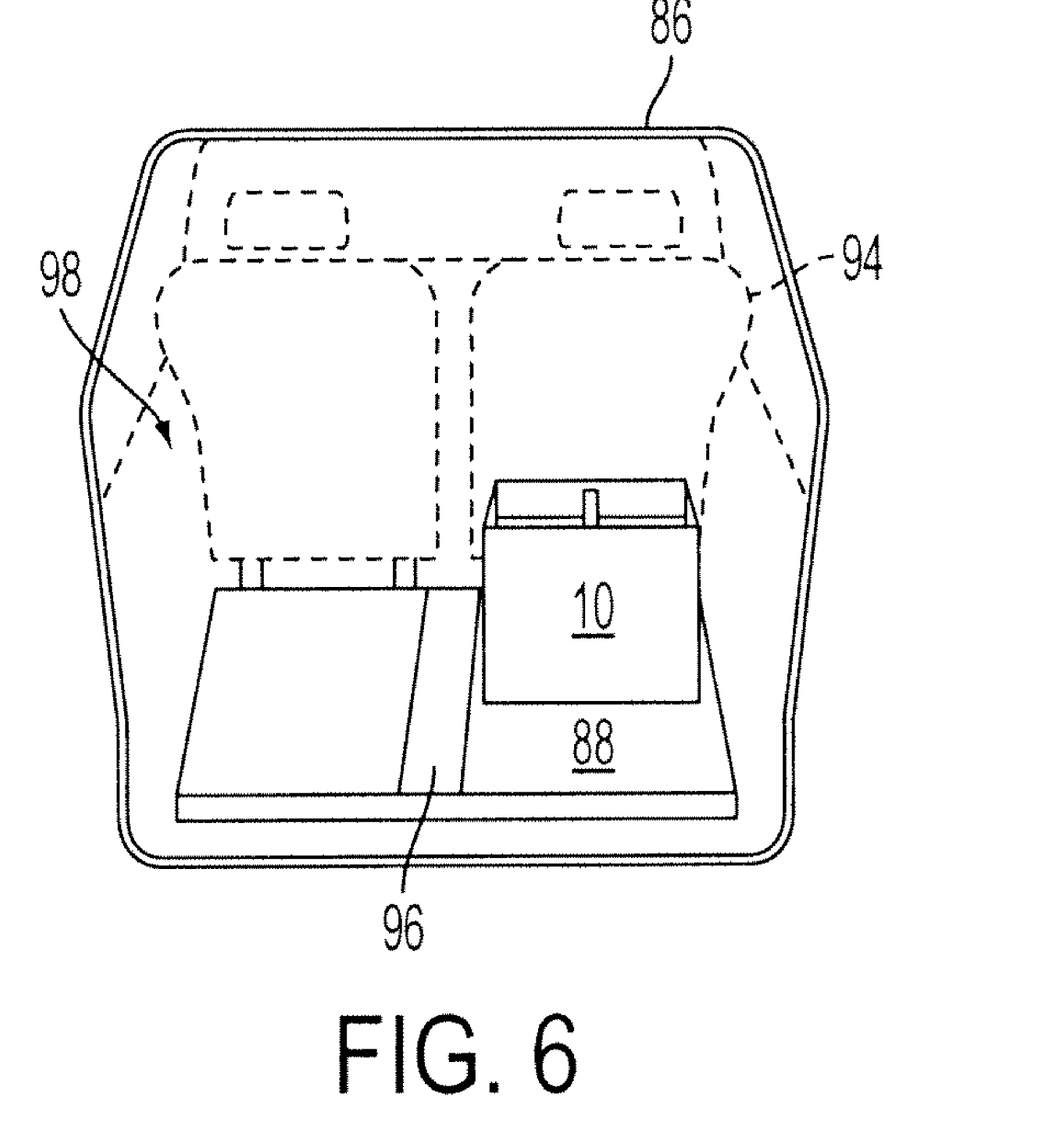
FIG. 6 is an elevation view illustration of rear seat area or cargo area of a vehicle such as the vehicle of FIG. 5.

Referring now to the illustrations of FIG. 5 and FIG. 6 the deployment of the portable device 10 on the rear floor 88 of an automobile vehicle 86 such as a sedan, a sports utility vehicle or the like. Although these drawings and the description herein reference deployment on a rear floor 88 of an automobile, such as found in a sedan, the portable device 10 could also be deployed using a rear seat 90 or a trunk 92. Alternatively, the portable device may also be deployed using a rear cargo area of a vehicle such as a minivan or sport utility vehicle. It should be appreciated that the rear door of the vehicle 86 illustrated in FIG. 5 has been removed for clarity.

Space on the rear floor 88 of a vehicle 86 presents a number of constraints on the portable device 10. The portable device 10 must be sized to fit within constraints such as the rear seat 90 and the front seat 94 so as to limit the width of the portable device 10. In the exemplary embodiment, the housing 12 of the portable device 10 is less than 5 inches. The front seat 94 is typically angled to provide comfort and structural support for a front seat passenger. As such, the front seat 94 vertically constrains the height of the portable device 10. In the exemplary embodiment, the height of the portable device 10 is less than 18 inches. Further, in many vehicles 86, the length of the portable device 10 may be constrained by an elevated portion 96 typically located in the center of the car to allow a drivetrain to pass from the engine to the rear wheels of the vehicle. In the exemplary embodiment, the width of the housing 12 of portable device 10 is less than 18 inches. It should be appreciated that other dimensions may be more appropriate provided that portable device 10 remains sized to fit within the desired transportation area 98 in a vehicle without causing damage or unnecessary wear to the vehicle.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A portable device for generating two electric phases from a single phase, said device comprising:
   a housing sized to fit on the rear floor of a vehicle;
   a first and second input mounted to said housing;
   a toroidal transformer winding having primary and secondary sides, said toroidal transformer winding mounted within said housing, said toroidal transformer winding primary side being electrically coupled to said first and second input; and,
   a first, second and third of output electrically coupled to said toroidal transformer winding secondary side.

2. The portable device for generating two electric phases from a single phase of claim 1 wherein:
   said first input is a first phase input electrically coupled to one end of said toroidal transformer winding primary side; and,
   said second input is a neutral input electrically coupled to said toroidal transformer winding primary side between said first phase input and the opposite end of said toroidal transformer.

3. The portable device for generating two electric phases from a single phase of claim 2 wherein said plurality of outputs comprises:
   a first phase output electrically coupled to one end of said toroidal transformer winding secondary side;
   a second phase output electrically coupled to an end said toroidal transformer winding secondary side opposite said first phase; and,
   a neutral output phase output and said second phase output.

4. The portable device for generating two electric phases from a single phase of claim 3 wherein said toroidal transformer has a turn ratio of 2:1.

5. The portable device for generating two electric phases from a single phase of claim 4 wherein said housing has a width of less than 5 inches.

6. The portable device for generating two electric phases from a single phase of claim 5 wherein said housing has a height of less than 18 inches.

7. The portable device for generating two electric phases from a single phase of claim 6 wherein said housing has a length of less than 18 inches.

8. The portable device for generating two electric phase from a single phase of claim 7 wherein said device has a weight of less than 60 lbs.

9. A portable device for generating two electric phases from a single phase of electricity, said device comprising:
- a housing having a handle, said housing being sized and of an appropriate weight to be carried by a single person;
- a first, second and third phase inputs mounted to said housing;
- a toroidal transformer mounted to said housing, said toroidal transformer being electrically coupled to said first, second and third phase inputs;
- a switch electrically coupled to said first, second and third inputs; and,
- a first, second and third phase outputs mounted to said housing and electrically coupled to said toroidal transformer.

10. The portable device for generating two electric phases from a single phase of electricity of claim 9 further comprising a ground lug mounted and electrically connected to said housing adjacent said first, second and third inputs.

11. The portable device for generating two electric phases from a single phase of electricity of claim 10 wherein said switch includes means for opening said switch in response to an increase in current or temperature.

12. The portable device for generating two electric phases from a single phase of electricity of claim 11 wherein said toroidal transformer has a turn ratio of 2:1.

13. The portable device for generating two electric phases from a single phase of electricity of claim 12 wherein said device has a weight of less than 60 lbs.

14. The portable device for generating two electric phases from a single phase of electricity of claim 13 wherein said device has a width of less than 5 inches, a height of less than 18 inches and a length of less than 18 inches.

15. A portable electrical phase generator comprising:
- a housing sized to fit in the rear of a vehicle, said housing having a recessed top portion;
- a handle mounted to said housing in said housing recess;
- a first terminal block having a plurality of phase inputs mounted to said housing wherein at least one of the phases is a neutral phase;
- a toroidal transformer having a primary winding and a secondary winding, said toroidal transformer being mounted to said housing and electrically coupled to said plurality of phase inputs; and,
- a second terminal block having a plurality of phase outputs electrically coupled to said toroidal transformer secondary winding.

16. The portable electrical phase generator of claim 15 wherein said housing is sized to fit in a trunk of a vehicle.

17. The portable electrical phase generator of claim 15 wherein said housing is sized to fit on a rear seat of a vehicle.

18. The portable electrical phase generator of claim 17 further comprising a visual indicator electrically coupled to said first terminal block and mounted to said housing.

19. The portable electrical phase generator of claim 18 wherein said device is sized and of an appropriate weight to be carried by a single person.

20. The portable electrical phase generator of claim 19 wherein said device weighs less than 60 lbs.

* * * * *